United States Patent [19]
Nam et al.

[11] Patent Number: 5,617,150
[45] Date of Patent: Apr. 1, 1997

[54] VIDEO BIT RATE CONTROL METHOD

[75] Inventors: Jae Y. Nam; Sang G. Park; Young S. Lee; Chie T. Ahn, all of Daejeon, Rep. of Korea

[73] Assignee: Electronics and Telecommunication Research Institute, Daejeon, Rep. of Korea

[21] Appl. No.: 492,158

[22] Filed: Jun. 19, 1995

[30]  Foreign Application Priority Data

Dec. 2, 1994 [KR] Rep. of Korea .................. 94-32590

[51] Int. Cl.$^6$ ............................................. H04N 7/36
[52] U.S. Cl. ......................... 348/700; 348/419; 348/415
[58] Field of Search ......................... 348/384, 390, 348/699, 700, 400, 401, 402, 404, 405, 409, 412, 413, 415, 416, 419

[56] References Cited

U.S. PATENT DOCUMENTS

| | | | |
|---|---|---|---|
| 5,231,484 | 7/1993 | Gonzales et al. | 348/405 |
| 5,506,686 | 4/1996 | Auyeung et al. | 348/409 |
| 5,532,746 | 7/1996 | Chang | 348/700 |

OTHER PUBLICATIONS

"A Bit Rate Control Approach for Hybird DPCM/DCT Video Coding." Limin Wang.
"Video Coding with Adaptive Quantization and Rate Control." C. Horne and A. Puri, SPIE, vol. 1818 Visual Communications and Image Processing '92. pp. 798–806.

*Primary Examiner*—A. Au
*Attorney, Agent, or Firm*—Keck, Mahin & Cate

[57] ABSTRACT

A video bit rate control method. SUBGOPs are defined as sets of two to four frames in a GOP. For example, if the GOP comprises IBBPBBPBBPBB frames, each of the SUBGOPs is defined as a set of the IBBP or BBP frames. Before bit assignment is performed with respect to frames to be coded, it is checked whether a scene change is present with respect to frames in successive ones of the SUBGOPs. If it is checked that the scene change is not present, a bit rate is controlled in a conventional manner. In the case where the scene change is present, a smaller bits than that in the conventional manner is assigned to frames with no scene change and a relatively large bit amount is assigned to a frame with the scene change. Therefore, according to the present invention, the video bit rate control method has the effect of preventing a degradation in a picture quality due to the scene change.

5 Claims, 6 Drawing Sheets

(b)

VIDEO BIT RATE CONTROL METHOD

BACKGROUND OF THE INVENTION

1. Field of the Invention

The present invention relates in general to the control of a video bit rate, and more particularly to a video bit rate control method for controlling the video bit rate effectively even upon occurrence of a sudden scene change.

2. Description of the Prior Art

Generally, in the case of coding motion pictures, the generated bits for each frame must be varied according to a frame complexity to maintain a picture quality constant. However, in the case of coding the motion pictures to transmit them, a coded output bit rate is required to be maintained constant because coded data must be transmitted through constant channel bandwidth.

In order to maintain the coded output bit rate constant, bits necessary to the coding must be controlled properly every frame. In this case, a degradation in the picture quality may become an issue. As a result, there has been proposed an effective video bit rate control method which is capable of avoiding an abrupt degradation in the picture quality and maintaining the coded output bit rate constant within the transmission channel band.

Referring to FIG. 1, there is shown a block diagram of a general video bit rate control apparatus. As shown in this drawing, the video bit rate control apparatus comprises a video frame input unit 1 for inputting a video frame, a coder 2 for coding the video frame by the video frame input unit 1, and a buffer 3 for storing temporarily the coded data from the coder 2 and transmitting the stored data externally according to a constant transmission bit rate. The video bit rate control apparatus further comprises a video bit rate controller 4 for controlling an output bit rate of the coder 2 according to a storage level of the buffer 3 to prevent an overflow or an underflow of the buffer 3.

Referring to FIG. 2, there is shown a flowchart illustrating a conventional video bit rate control method. constant bits are first assigned according to a limited transmission rate to each of a certain number of frames of a group of pictures (referred to hereinafter as GOP) to be coded. The subsequent bit assignment is performed in the frame coding order in consideration of characteristics of the frames and the remaining bits of every frame.

Namely, at the step 201, assignment bits are calculated with respect to the frames in the GOP to be coded, in consideration of a bit redundancy of the GOP, the frame characteristics and the number of the frames remaining in the GOP, not coded. At the step 202, assignment bits are calculated in the unit of block according to assignment bits for frames and the storage level of the buffer 3 at the time point that blocks are coded. As a result of the calculation of the assignment bits at the step 202, quantization parameters are obtained at the step 203. Then at the step 203, the resultant assignment bits are transferred to the coder 2.

It is checked at the step 204 whether a current block is a last one in the current frame to be coded. If it is checked at the step 204 that the current block is not the last one in the current frame to be coded, the assignment bits are calculated in the unit of block up to the last block in the current frame at the step 202 and the quantization parameters are obtained at the step 203. Namely, the steps 202 and 203 are repeatedly performed up to the last block in the current frame. On the contrary, if it is checked at the step 204 that the current block is the last one in the current frame, the above operation is repeatedly performed with respect to a new frame.

By the way, in the above-mentioned conventional video bit rate control method, in the case where a sudden scene change occurs in the middle of coding the frames in the GOP, much bits are required to maintain the picture quality constant. In this case, the remaining bit amount is used to code a scene change frame and the subsequent frames because the constant bit amount was used for the frames previously coded. As a result, there is caused a degradation in the picture quality in any form. This degradation in the picture quality has a bad effect on a high definition television application.

SUMMARY OF THE INVENTION

Therefore, the present invention has been made in view of the above problem, and it is an object of the present invention to provide a video bit rate control method in which SUBGOPs are defined as sets of two to four frames in a GOP (for example, if the GOP comprises IBBPBBPBBPBB frames, each SUBGOP is defined as a set of the IBBP or BBP frames), it is checked, before bit assignment is performed with respect to frames to be coded, whether a scene change is present with respect to frames in successive ones of the SUBGOPs, a bit rate is controlled in a conventional manner if the scene change is not present, and, if the scene change is present, smaller bits than that in the conventional manner are assigned to frames with no scene change and a relatively large bits are assigned to a frame with the scene change, so that a degradation in a picture quality due to the scene change can be prevented.

In accordance with the present invention, the above and other objects can be accomplished by a provision of a video bit rate control method for a video bit rate control apparatus which comprises video frame input means for inputting a video frame, coding means for coding the video frame inputted by the video frame input means, buffering means for storing temporarily the coded result from the coding means; and video bit rate control means fox controlling an output bit rate of the coding means according to a storage level of the buffering means to prevent an overflow or an underflow of the buffering means. The video bit rate control method comprises the first step of defining a plurality of SUBGOPs in a GOP and checking whether a scene change is present in successive two of the SUBGOPs, the successive two SUBGOPs being current and subsequent SUBGOPs; the second step of checking whether last frames in the current and subsequent SUBGOPs are predicted frames, if it is checked at the first step that the scene change is present in the subsequent SUBGOP, and calculating assignment bits with respect to frames to be coded or applying weights to the assignment bits in accordance with the checked result; the third step of checking whether the last frame in the current GOP and a last frame in a previous SUBGOP are the predicted frames, if it is checked at the first step that the scene change is not present in the subsequent SUBGOP, and calculating the assignment bits with respect to the frames to be coded or assigning extra bits additionally to the assignment bits in accordance with the checked result; and the fourth step of calculating assignment bits in the unit of block according to the calculated assignment bits for frames and the storage level of the buffering means at the time point that blocks are coded, obtaining quantization parameters as a result of the calculation of the assignment bits in the unit of block, transferring the resultant assignment bits to the coding means and performing repeatedly the above operation up to a last one of the blocks.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
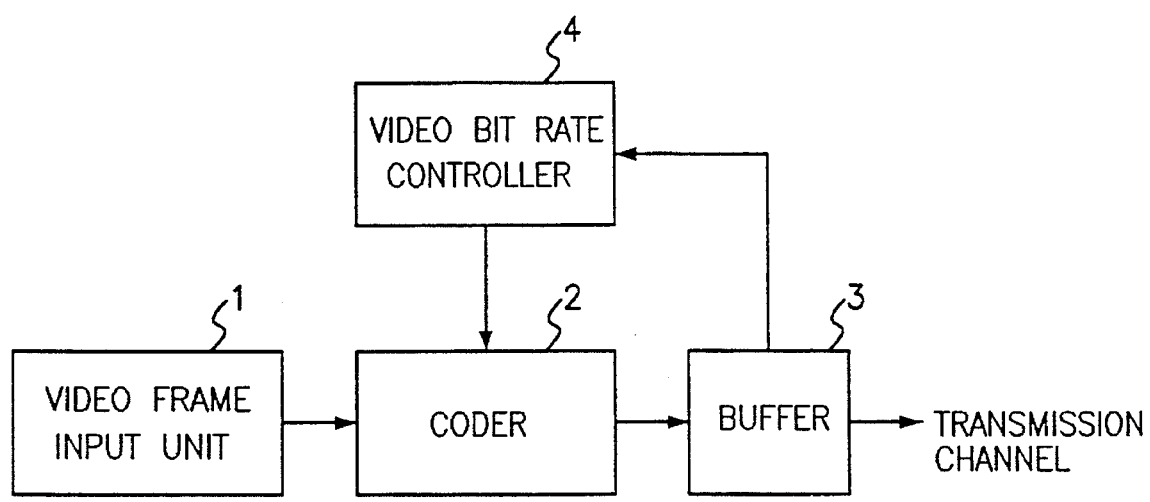
FIG. 1 is a block diagram of a general video bit rate control apparatus.
Figure 2:
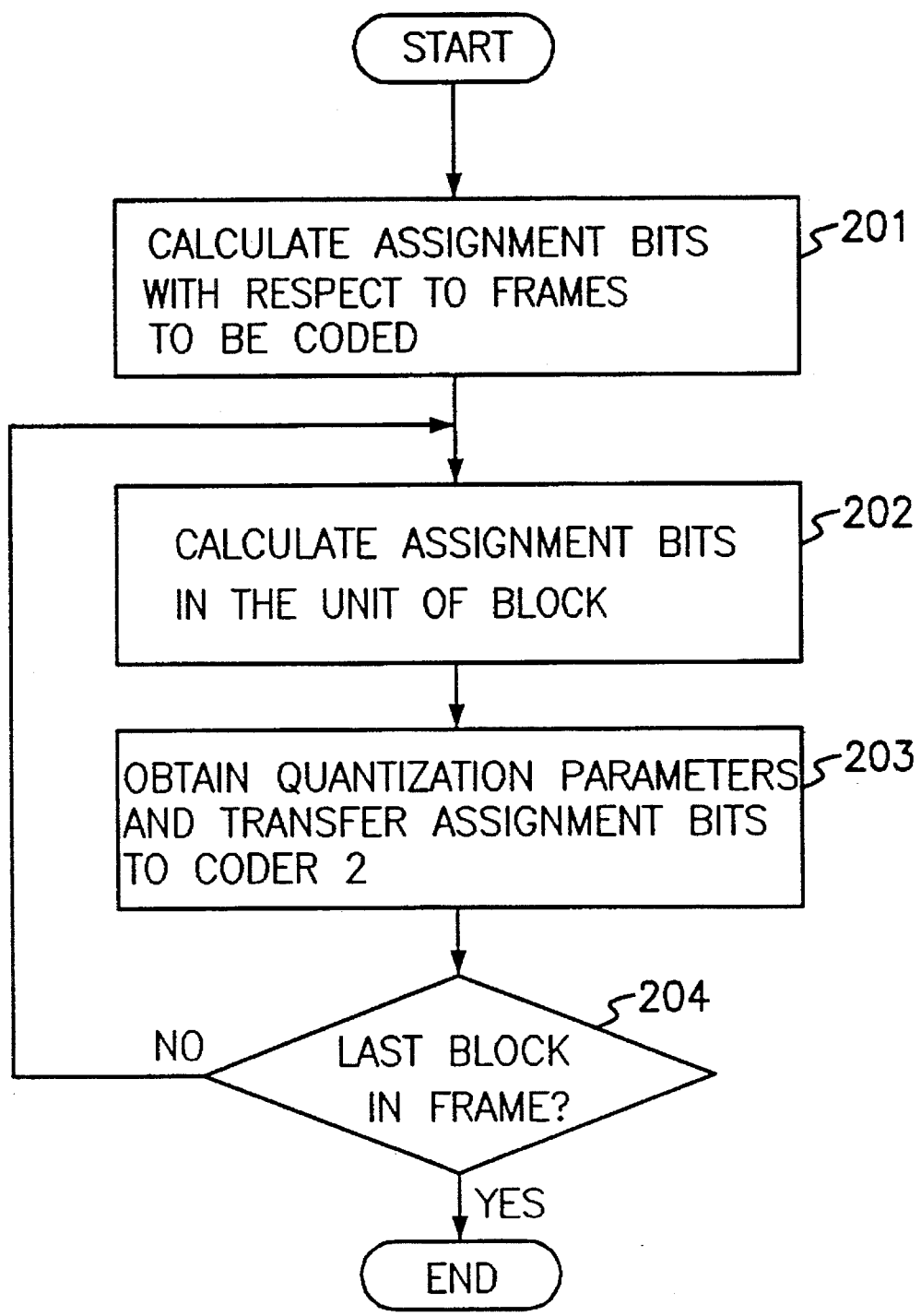
FIG. 2 is a flowchart illustrating a conventional video bit rate control method.
Figure 3A:
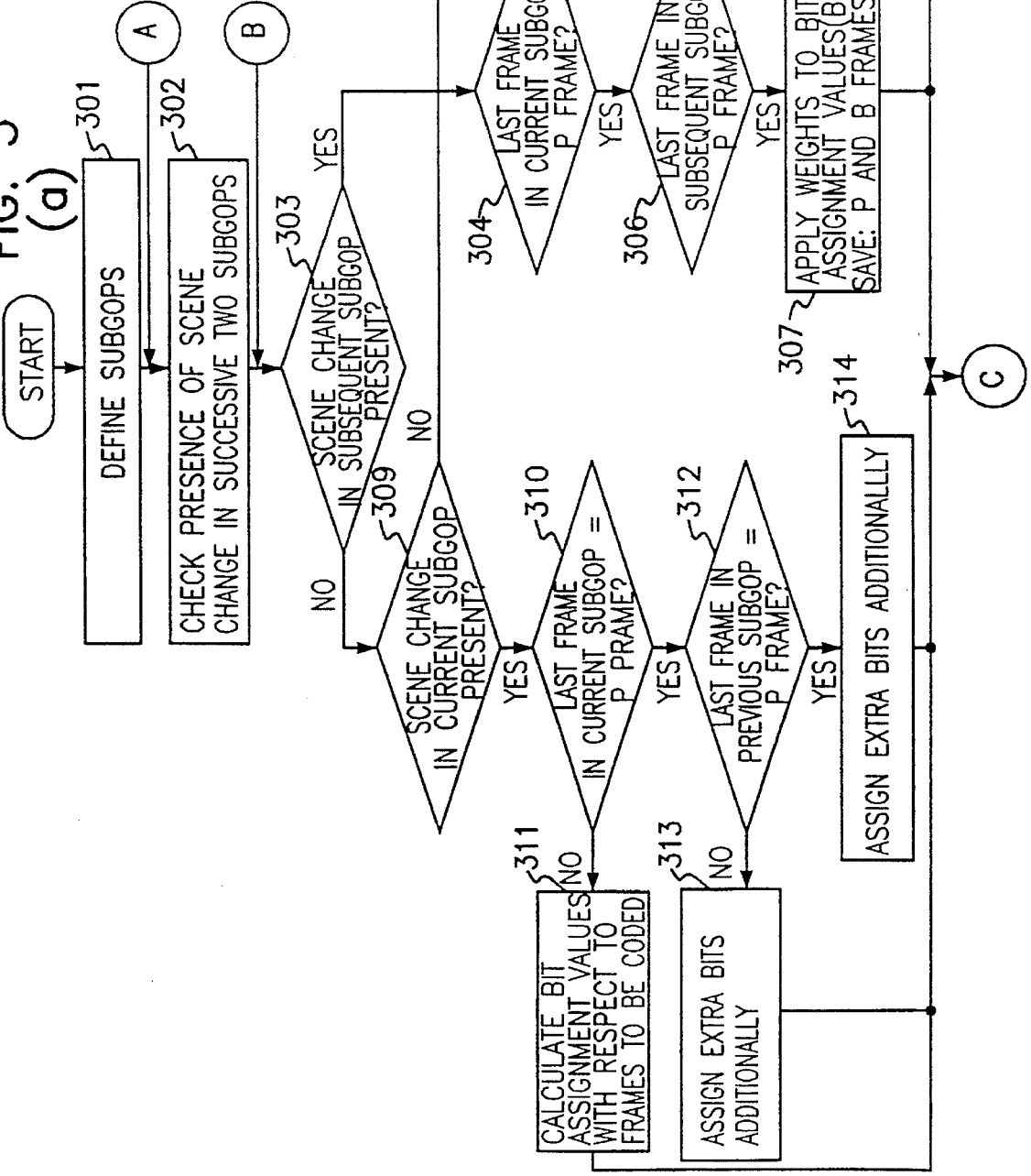
FIGS. 3(a) and 3(b) are a flowchart illustrating a video bit rate control method in accordance with the present invention.
Figure 3:
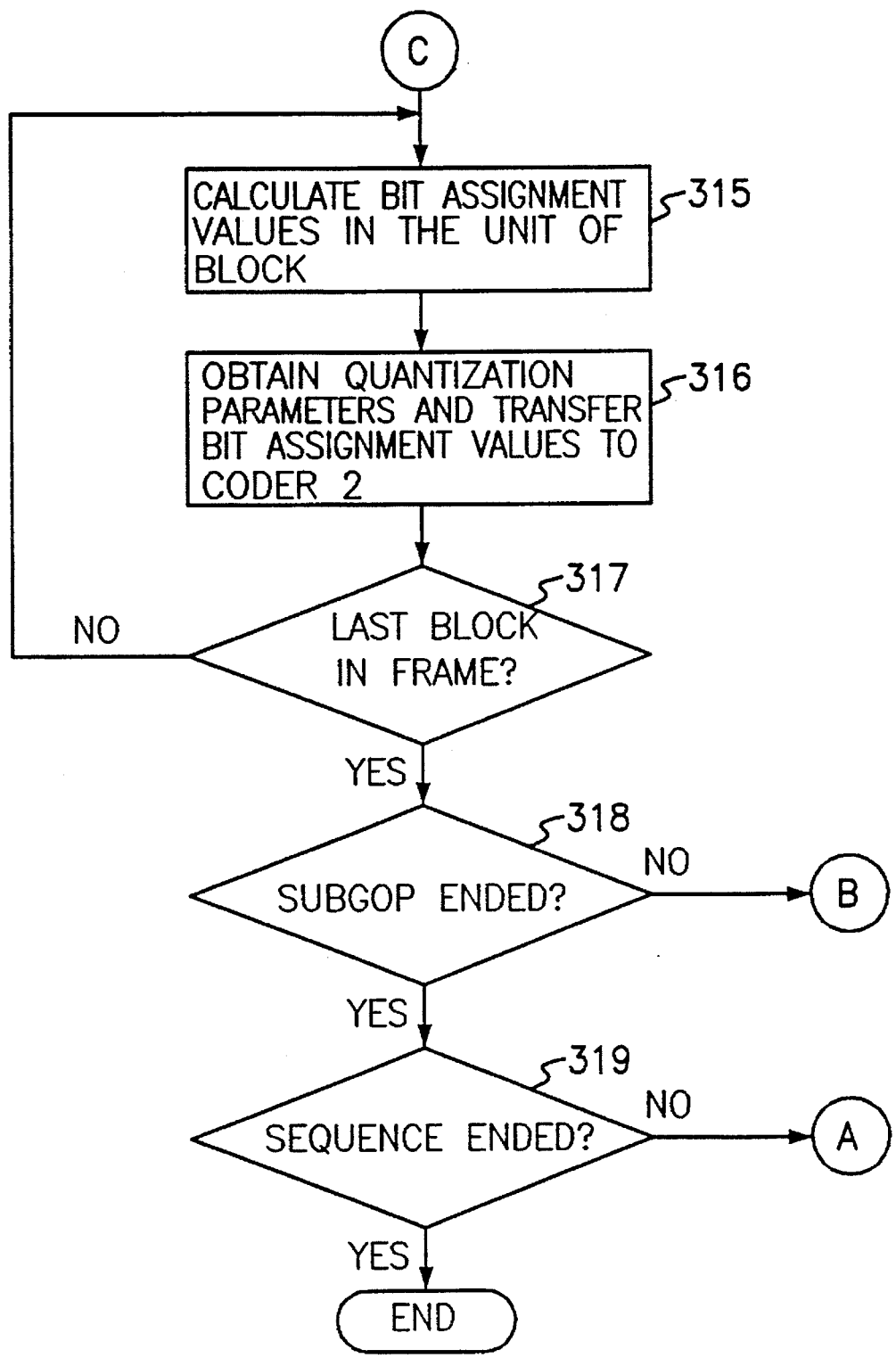

Referring to FIG. 3, there is shown a flowchart illustrating a video bit rate control method in accordance with the present invention. In order to increase a coding efficiency of motion pictures, as in an MPEG coding method, a GOP is classified into intra (referred to hereinafter as I) frames, predicted (referred to hereinafter as P) frames and bidirectionally predicted (referred to hereinafter as B) frames for coding. The GOP comprises a plurality of SUBGOPs, each of which is defined as a set of the IBBP(or BBP) frames, a set of the IBP(or BP) frames or a set of the IP(or PP) frames in the frame order at the step 301.

It is checked at the step 302 whether a scene change is present in successive two of the SUBGOPs. The successive two SUBGOPs are current and subsequent SUBGOPs. If it is discriminated at the step 303 that the scene change is present in the subsequent SUBGOP, it is checked at the step 304 whether a last frame in the current SUBGOP is the P frame. If it is checked at the step 304 that the last frame in the current SUBGOP is not the P frame, weights are applied to assignment bits to save the bits number at the step 305.

On the contrary, if the last frame in the current SUBGOP is the P frame at the step 304, it is checked at the step 306 whether a last frame in the subsequent SUBGOP is the P frame. In the case where it is checked at the step 306 that the last frame in the subsequent SUBGOP is the P frame, the weights are applied to the assignment bits to save the bits number at the step 307. If it is checked at the step 306 that the last frame in the subsequent SUBGOP is not the P frame, the assignment bits are calculated with respect to frames to be coded, in a conventional manner, at the step 308.

In the case where the scene change is not present in the subsequent SUBGOP at the step 303, it is checked at the step 309 whether the scene change is present in the current SUBGOP. If it is checked at the step 309 that the scene change is not present in the current SUBGOP, the assignment bits are calculated with respect to the frames to be coded, in the conventional manner, at the step 308. On the contrary, if the scene change is present in the current SUBGOP at the step 309, it is checked at the step 310 whether the last frame in the current SUBGOP is the P frame.

If the last frame in the current SUBGOP is not the P frame at the step 310, the assignment bits are calculated with respect to the frames to be coded, at the step 311. On the contrary, if it is checked at the step 310 that the last frame in the current SUBGOP is the P frame, it is checked at the step 312 whether a last frame in a previous SUBGOP is the P frame.

When the last frame in the previous SUBGOP is not the P frame at the step 312, bits saved in frame coding of the previous SUBGOP are additionally assigned to the P frame at the step 313. On the contrary, if the last frame in the previous SUBGOP is the P frame at the step 312, the bits saved in the frame coding of the previous SUBGOP are additionally assigned to the P frame at the step 314.

At the step 315, assignment bits are calculated in the unit of block according to the assignment bits by frames and the storage level of the buffer 3 at the time point that blocks are coded. As a result of the calculation of the assignment bits at the step 315, quantization parameters are obtained at the step 316. Then at the step 316, the resultant assignment bits are transferred to the coder 2. It is checked at the step 317 whether a current block is a last one in a current frame to be coded. If it is checked at the step 317 that the current block is not the last one in the current frame to be coded, the assignment bits are calculated in the unit of block up to the last block in the current frame at the step 315 and the quantization parameters are obtained at the step 316. Namely, the steps 315 and 316 are repeatedly performed up to the last block in the current frame. On the contrary, if the current block is the last one in the current frame at the step 317, the above operation is repeatedly performed with respect to a new frame.

In accordance with the preferred embodiment of the present invention, in the case where the GOP is in the form of the IBBP(or BBP) frames, a relatively small bits are assigned to the frames preceding to three to five before the frame with the scene change. In the case where the GOP is in the form of the IBP(or BP) and IP(or PP) frames, a relatively small bits are assigned to the frames preceding to two to three before the frame with the scene change.

The steps 308 and 311 of calculating the assignment bits with respect to the frames to be coded are performed in consideration of a bit redundancy of the GOP, the frame type (I, P and B) and the number of the frames remaining in the GOP, not coded, in a similar manner to that in a conventional video bit rate control method ISO(International Organization for Standardization) IEC (International Electrotechnical Commission)/JTC1 (Joint Technical Committee 1) SC29 (Sub-Committee 29)/WG11 (Working Group 11), MPEG- (Moving Picture Experts Group), TM(Test Model).

Figure 4:
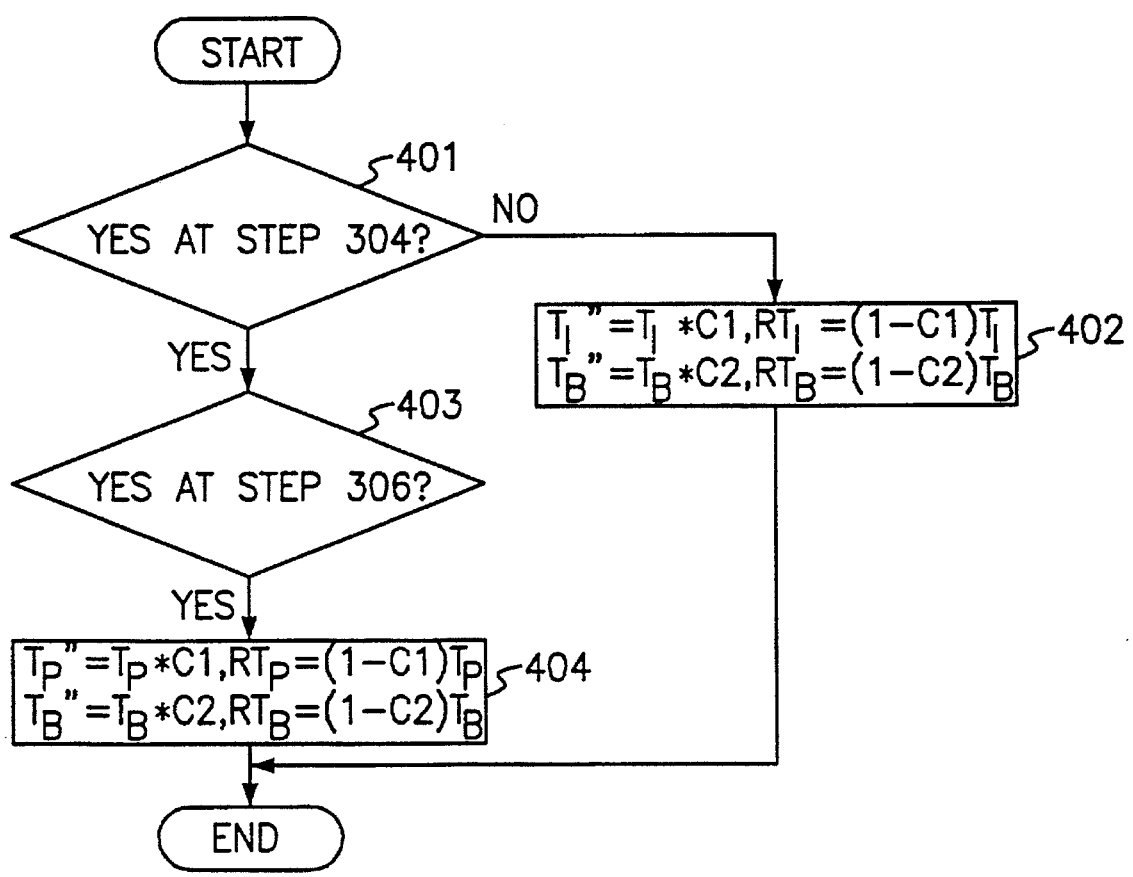
FIG. 4 is a flowchart illustrating the step of applying weights to assignment bits in FIG. 3.

FIG. 4 is a flowchart illustrating the steps 305 and 307 of applying the weights to the assignment bits to assign smaller bits than that of the steps 308 and 311 to the frames to be coded. First, it is checked at the step 401 whether the last frame in the current SUBGOP is the P frame. If it is checked at the step 401 that the last frame in the current SUBGOP is not the P frame, the weights are applied to the assignment bits on the basis of the following expressions to make the assignment bits relatively small, at the step 402:

$$T_I''=T_I*C1$$

$$RT_I=(1-C1)T_I$$

$$T_B''=T_B*C2$$

$$RT_B=(1-C2)T_B$$

On the contrary, if it is checked at the step 401 that the last frame in the current SUBGOP is the P frame, it is checked at the step 403 whether the last frame in the subsequent SUBGOP is the P frame. If it is checked at the step 403 that the last frame in the subsequent SUBGOP is the P frame, the weights are applied to the assignment bits on the basis of the following expressions to make the assignment bits relatively small, at the step 404:

$$T_P''=T_P*C1$$

$$RT_P=(1-C1)T_P$$

$$T_B''=T_B*C2$$

$$RT_B=(1-C2)T_B$$

Figure 5:
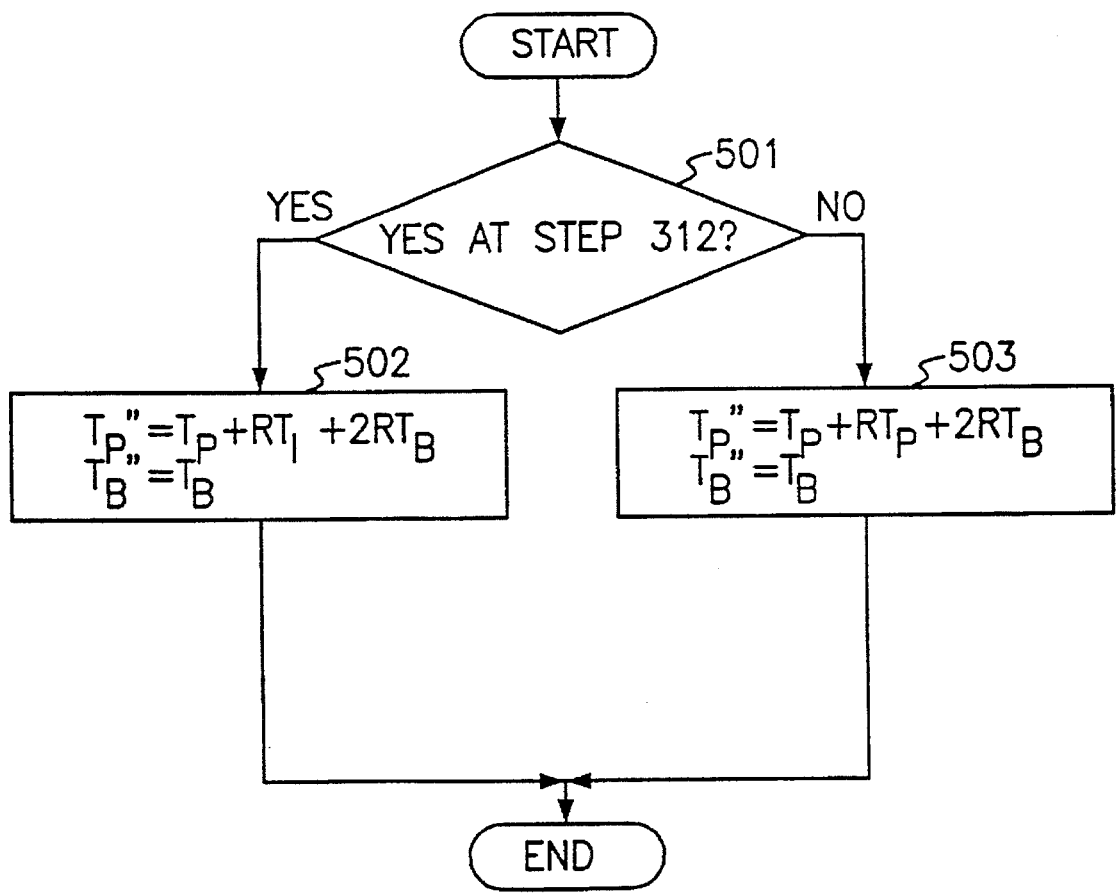
FIG. 5 is a flowchart illustrating the step of applying extra bits additionally to assignment bits in FIG. 3.

FIG. 5 is a flowchart illustrating the steps 313 and 314 of applying the extra bits additionally to the assignment bits to assign larger bits than that of the steps 308 and 311 to the frames to be coded. First, it is checked at the step 501 whether the last frame in the previous SUBGOP is the P frame. If it is checked at the step 501 that the last frame in the previous SUBGOP is the P frame, the bits saved in the previous SUBGOP are additionally assigned at the step 502 on the basis of the following expressions:

$$T_P''=T_P+RT_P+2RT_B$$

$$T_B''=T_B$$

On the contrary, if it is checked at the step 501 that the last frame in the previous SUBGOP is not the P frame, the bits saved in the previous SUBGOP are additionally assigned at the step 503 on the basis of the following expressions:

$$T_P''=T_P+RT_I+2RT_B$$

$$T_B''=T_B$$

In FIGS. 4 and 5, $T_I$, $T_P$ and $T_B$ are target bits of the I, P and B frames, respectively, which are defined in a similar manner to target bit rates of an MPEG system $T_I''$, $T_P''$ and $T_B''$ are modified target bits in I, P and B modes, respectively. C1 and C2 are weights smaller than 1. $RT_I$, $RT_P$ and $RT_B$ are the number of bits saved in the I, P and B frames of the previous SUBGOP to code the scene change frame, respectively.

As apparent from the above description, according to the present invention, the video bit rate control method can control the video bit rate effectively even upon the occurrence of the sudden scene change. Therefore, the video bit rate control method of the present invention can effectively be applied to a broadcasting field in which a degradation in a picture quality due to the scene change becomes an issue, or a digital storage medium edit field in which a high efficient compression is required. Further, the video bit rate control method of the present invention may be applied to a video communication video codec such as a video phone, a storage medium video codec and a digital broadcasting video codec utilizing a digital video compression technique.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video bit rate control method for a video bit rate control apparatus which comprises video frame input means for inputting a video frame, coding means for coding the video frame inputted by said video frame input means, buffering means for storing temporarily the coded result from said coding means; and video bit rate control means for controlling an output bit rate of said coding means according to a storage level of said buffering means to prevent an overflow or an underflow of said buffering means, said method comprising the steps of:

(a) defining a plurality of SUBGOPs in a group of pictures (GOP) and checking whether a scene change is present in successive two of said SUBGOPs, the successive two SUBGOPs being current and subsequent SUBGOPs;

(b) checking whether last frames in the current and subsequent SUBGOPs are predicted frames, if it is checked at said step (a) that the scene change is present in the subsequent SUBGOP, and calculating assignment bits with respect to frames to be coded or applying weights to the assignment bits in accordance with the checked result;

(c) checking whether the last frame in the current GOP and a last frame in a previous SUBGOP are the predicted frames, if it is checked at said step (a) that the scene change is not present in the subsequent SUBGOP, and calculating the assignment bits with respect to the frames to be coded or assigning extra bits additionally to the assignment bits in accordance with the checked result; and (d) calculating assignment bits in the unit of block according to the calculated assignment bits by frames and the storage level of said buffering means at the time point that blocks are coded, obtaining quantization parameters as a result of the calculation of the assignment bits in the unit of block, transferring the resultant assignment bits to said coding means and performing repeatedly the above operation up to a last one of said blocks.

2. A video bit rate control method as set forth in claim 1, wherein said step (b) includes the steps of:

(b-1) checking whether the last frame in the current SUBGOP is the predicted frame, if it is checked at said step (a) that the scene change is present in the subsequent SUBGOP;

(b-2) applying the weights to the assignment bits to save the bits number, if it is checked at said step (b-1) that the last frame in the current SUBGOP is not the predicted frame, and checking whether the last frame in the subsequent SUBGOP is the predicted frame, if it is checked at said step (b-1) that the last frame in the current SUBGOP is the predicted frame; and (b-3) applying the weights to the assignment bits to save the bits, if it is checked at said step (b-2) that the last frame in the subsequent SUBGOP is the predicted frame, and calculating the assignment bits with respect to the frames to be coded, if it is checked at said step (b-2) that the last frame in the subsequent SUBGOP is not the predicted frame.

3. A video bit rate control method as set forth in claim 2, wherein said step of applying the weights to the assignment bits includes the steps of:

applying the weights to the assignment bits on the basis of the following expressions to make the assignment bits relatively small, if the last frame in the current SUBGOP is not the predicted frame:

$$T_I''=T_I*C1$$

$$RT_I=(1-C1)T_I$$

$$T_B''=T_B*C2$$

$$RT_B=(1-C2)T_B;\text{ and}$$

applying the weights to the assignment bits on the basis of the following expressions to make the assignment bits relatively small, if the last frame in the current SUBGOP is the predicted frame and the last frame in the subsequent SUBGOP is the predicted frame:

$$T_P''=T_P*C1$$

$$RT_P=(1-C1)T_P$$

$$T_B''=T_B*C2$$

$$RT_B=(1-C2)T_B$$

where, $T_I$, $T_P$ and $T_B$ are target bits of intra, predicted and bidirectionally predicted frames, respectively, $T_I''$, $T_P''$ and $T_B''$ are modified target bits in intra, predicted and bidirectionally predicted modes, respectively, C1 and C2 are weights smaller than 1, and $RT_I$, $RT_P$ and $RT_B$ are the number of bits saved in the intra, predicted and bidirectionally predicted frames of the previous SUBGOP to code a scene change frame, respectively.

4. A video bit rate control method as set forth in claim 1, wherein said step (c) includes the steps of:

(c-1) checking whether the scene change is present in the current SUBGOP, if it is checked at said step (a) that the scene change is not present in the subsequent SUBGOP;

(c-2) calculating the assignment bits with respect to the frames to be coded, if it is checked at said step (c-1) that the scene change is not present in the current SUBGOP, and checking whether the last frame in the current SUBGOP is the predicted frame, if it is checked at said step (c-1) that the scene change is present in the current SUBGOP;

(c-3) calculating the assignment bits with respect to the frames to be coded, if it is checked at said step (c-2) that the last frame in the current SUBGOP is not the predicted frame, and checking whether the last frame in the previous SUBGOP is the predicted frame, if it is checked at said step (c-2) that the last frame in the current SUBGOP is the predicted frame; and (c-4) assigning additionally bits saved in frame coding of the previous SUBGOP to intra and bidirectionally predicted frames if it is checked at said step (c-3) that the last frame in the previous SUBGOP is not the predicted frame and assigning additionally the bits saved in the frame coding of the previous SUBGOP to the predicted and bidirectionally predicted frames if it is checked at said step (c-3) that the last frame in the previous SUBGOP is the predicted frame.

5. A video bit rate control method as set forth in claim 4, wherein said step of assigning the extra bits additionally to the assignment bits includes the steps of:

assigning additionally the bits saved in the previous SUBGOP on the basis of the following expressions if the last frame in the previous SUBGOP is the predicted frame:

$$T_P''=T_P+RT_P+2RT_B$$

$$T_B''=T_B;\text{ and}$$

assigning additionally the bits saved in the previous SUBGOP on the basis of the following expressions if the last frame in the previous SUBGOP is not the predicted frame:

$$T_P''=T_P+RT_I+2RT_B$$

$$T_B''=T_B$$

where, $T_P$ and $T_B$ are target bits or the predicted and bidirectionally predicted frames, respectively, $T_P''$ and $T_B''$ are target bits in predicted and bidirectionally predicted modes, respectively, and $RT_I$, $RT_P$ and $RT_B$ are the number of bits saved in the intra predicted and bidirectionally predicted frames of the previous SUBGOP to code a scene change frame, respectively.

\* \* \* \* \*